United States Patent
Tawara

(10) Patent No.: US 10,403,321 B2
(45) Date of Patent: *Sep. 3, 2019

(54) METHOD FOR MANUFACTURING GLASS SUBSTRATE AND METHOD FOR MANUFACTURING MAGNETIC DISK

(71) Applicant: Yoshihiro Tawara, Hokuto (JP)

(72) Inventor: Yoshihiro Tawara, Hokuto (JP)

(73) Assignee: HOYA CORPORATION, Tokyo (JP)

( * ) Notice: Subject to any disclaimer, the term of this patent is extended or adjusted under 35 U.S.C. 154(b) by 321 days.

This patent is subject to a terminal disclaimer.

(21) Appl. No.: 15/023,938

(22) PCT Filed: Sep. 29, 2014

(86) PCT No.: PCT/JP2014/075965
§ 371 (c)(1),
(2) Date: Mar. 22, 2016

(87) PCT Pub. No.: WO2015/046542
PCT Pub. Date: Apr. 2, 2015

(65) Prior Publication Data
US 2016/0217818 A1    Jul. 28, 2016

(30) Foreign Application Priority Data
Sep. 28, 2013 (JP) .................. 2013-202841

(51) Int. Cl.
| G11B 5/84 | (2006.01) |
| C09G 1/02 | (2006.01) |
| C09G 1/16 | (2006.01) |

(52) U.S. Cl.
CPC .............. *G11B 5/8404* (2013.01); *C09G 1/02* (2013.01); *C09G 1/16* (2013.01)

(58) Field of Classification Search
CPC ........... G11B 5/8404; C09G 1/16; C09G 1/02
(Continued)

(56) References Cited

U.S. PATENT DOCUMENTS

| 2001/0009840 A1* | 7/2001 | Orii ....................... B24B 37/042 451/41 |
| 2012/0196033 A1* | 8/2012 | Sakai ................... G11B 5/8404 427/128 |
| 2015/0174734 A1 | 6/2015 | Ito et al. |

FOREIGN PATENT DOCUMENTS

| CN | 1069801 A | 3/1993 |
| CN | 101542606 A | 9/2009 |

(Continued)

OTHER PUBLICATIONS

Chinn R.E., Grinding and polishing; Ceramography: Preparation and Analysis of ceramic microstructures, Sep. 30, 2002, pp. 35-44.
(Continued)

*Primary Examiner* — Joseph J Hail
*Assistant Examiner* — J Stephen Taylor
(74) *Attorney, Agent, or Firm* — Global IP Counselors, LLP

(57) ABSTRACT

A method for manufacturing a glass substrate according to which surface roughnesses of main surfaces of a glass substrate can be reduced more than with currently available methods is provided. After the main surfaces of the glass substrate used in a magnetic disk are mirror-polished (final finishing-polished) using a polishing liquid containing organic-based particles made of, for example, a styrene-based resin, an acrylic resin, or a urethane-based resin as polishing abrasive particles, by cleaning the glass substrate using an organic-based cleaning agent, surface roughnesses of the main surfaces of the substrate can be reduced more than with currently available methods.

14 Claims, 1 Drawing Sheet

(58) Field of Classification Search
USPC .......................................................... 451/41
See application file for complete search history.

(56) References Cited

FOREIGN PATENT DOCUMENTS

| | | | |
|---|---|---|---|
| JP | 2007231209 | * | 9/2007 |
| JP | 2007-273680 A | | 10/2007 |
| JP | 2008-127243 A | | 6/2008 |
| JP | 2010-086563 A | | 4/2010 |
| JP | 2010086563 A | * | 4/2010 |
| JP | 2011-136402 A | | 7/2011 |
| JP | 2011136402 A | * | 7/2011 |
| WO | 2013/187358 A1 | | 12/2013 |

OTHER PUBLICATIONS

Written Opinion dated Nov. 1, 2016 in the counterpart Singapore patent application.
International Search Report in PCT/JP2014/075965 dated Dec. 16, 2014.
Written Opinion translated into Japanese in the corresponding Chinese Patent Application No. 201480053023.7, dated Apr. 4, 2018.
Office Action translated into Japanese in the corresponding Chinese Patent Application No. 201480053023.7, dated Jun. 4, 2019.

* cited by examiner

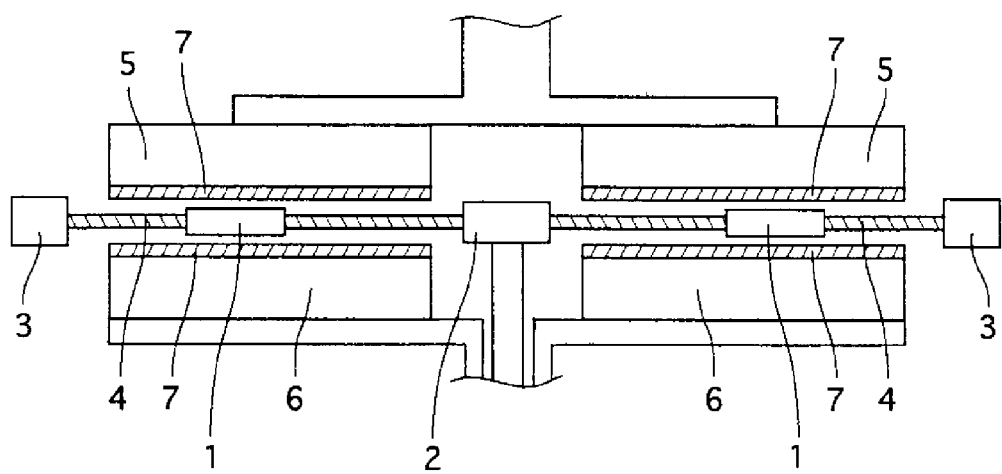

METHOD FOR MANUFACTURING GLASS SUBSTRATE AND METHOD FOR MANUFACTURING MAGNETIC DISK

CROSS-REFERENCE TO RELATED APPLICATIONS

This U.S. National stage application of International Patent Application No. PCT/JP2014/075965, filed on Sep. 29, 2014, which, in turn, claims priority under 35 U.S.C. § 119(a) to Japanese Patent Application No. 2013-202841, filed in Japan on Sep. 28, 2013, the entire contents of which are hereby incorporated herein by reference.

BACKGROUND

Field of the Invention

The present invention relates to a magnetic-disk glass substrate to be used in a magnetic disk that is provided in a magnetic recording apparatus such as a hard disk drive (simply referred to "HDD" hereinafter), a method for manufacturing, by photolithography, a glass substrate used to manufacture a semiconductor apparatus such as a LSI and a method for manufacturing a magnetic disk.

Background Information

Magnetic disks are one type of information recording media provided in magnetic recording apparatuses such as a HDDs. Magnetic disks are configured with a thin film such as a magnetic layer formed on a substrate, and conventionally an aluminum substrate has been used as the substrate. However, recently, in response to the pursuit of high recording density, glass substrates with which the gap between the magnetic head and the magnetic disk can be made narrower than with aluminum substrates have been increasingly used. The glass substrate surface is precisely polished such that the flying height of the magnetic head can be lowered as much as possible to achieve a high recording density. In recent years, the demand for HDDs with a larger storage capacity at lower cost has been increasing, and in order to achieve this, further quality improvement and cost reduction of magnetic-disk glass substrates are also required.

As described above, it is essential for a magnetic disk to have a highly smooth surface to achieve the low flying height that is necessary for achieving a high recording density. In order to attain a highly smooth magnetic disk surface, a highly smooth substrate surface is ultimately required, and thus it is necessary to precisely polish the surface of the glass substrate.

A conventional method for polishing a glass substrate involves polishing the glass substrate using a polishing pad with a polisher made of polyurethane or the like while supplying a slurry (polishing liquid) containing a polishing material of a metal oxide such as cerium oxide or colloidal silica. A highly smooth glass substrate can be obtained by additionally performing final polishing (mirror polishing) using colloidal silica abrasive particles after performing polishing using a cerium oxide-based polishing material.

SUMMARY

Although currently available HDDs can store about 320 gigabytes of information per 2.5-inch (diameter of 65 mm) magnetic disk, for example, there is demand for a further increase in recording density, such as the realization of 750 gigabytes, or even 1 terabyte, for example. Following such demand for HDDs with a larger storage capacity in recent years, the need for improvement in the surface quality of a substrate is greater than ever. Next-generation substrates for magnetic disks of 750 gigabytes, for example, such as described above will greatly influence the reliability of HDDs, and thus a further improvement from currently available HDDs is required in terms of the surface roughness of the substrate as well.

Next-generation substrates will greatly influence the reliability of HDDs for reasons such as the following.

A significant reduction is achieved in the flying height (the gap between the magnetic head and the surface of medium (magnetic disk)) of a magnetic head (lower flying height). This reduces the distance between the magnetic head and the magnetic layer of the medium, which makes it possible to write signals to a smaller region and pick up signals of smaller magnetic particles, and hence a high recording density can be achieved. In recent years, magnetic heads have been provided with a function called DFH (Dynamic Flying Height) control. This function causes only the recording and reproduction element portion of the magnetic head to protrude toward (approach) the medium surface by utilizing thermal expansion of a heating unit such as a heater incorporated in the vicinity of the recording and reproduction element portion, instead of lowering the flying height of a slider. Under such circumstances, in order to realize a lower flying height of the magnetic head, it is necessary to achieve high smoothness of the glass substrate surface.

Incidentally, in the conventional technology, a method of making the particle diameters of polishing abrasive particles used in a polishing step smaller is well known as a method for reducing the roughness of main surfaces of a glass substrate.

However, according to studies conducted by the inventor of the present invention, for example, in the case of colloidal silica abrasive particles used to perform conventional finishing-polishing, for example, even if abrasive particles having an average particle diameter of 10 nm or less are used, the trend of decreasing roughness of glass surface after polishing is no longer observed. It is inferred that the polishing abrasive particles are present between the glass surfaces and the polishing pads at the time of polishing, and the polishing pads are pressed against the glass surfaces by a predetermined load, and therefore minute abrasive particles sink into the polishing pads, resulting in a reduction in a protruding amount that contributes to polishing and a significant reduction in the grinding amount, as a result of which the effect of reducing surface roughness through polishing cannot be obtained.

Also, cleaning for removal of abrasive particles attached to the glass surfaces is performed after polishing, and usually, alkaline cleaning is performed in cleaning for removal of inorganic abrasive particles such as colloidal silica. Because alkaline components have the effect of etching glass, an increase in roughness of surfaces of a glass substrate after cleaning has been confirmed.

It is conceivable that in particular, colloidal silica has a hardness approximately equal to that of glass, and thus a non-uniform layer altered by processing is formed on the glass surface in polishing processing using colloidal silica as abrasive particles, the etching action of alkaline components on the layer altered by processing is also related to an increase in roughness of the glass surface. For example, a reduction in the size of the abrasive particles makes it possible to suppress the formation of a non-uniform layer altered by processing, but as described above, if the size of the abrasive particles is reduced, the effect of reducing surface roughness by polishing cannot be obtained.

Note that JP 2011-136402A above discloses that use of composite particles (heteroaggregates) of organic-based particles and inorganic particles having a size equivalent to or greater than that of the organic-based particles as polishing abrasive particles suppresses the occurrence of scratches.

However, with the polishing abrasive particles disclosed in JP 2011-136402A above, inorganic particles such as silica particles, for example, are thought to substantially exhibit the action of grinding glass, and even if polishing processing is performed with such polishing abrasive particles, it is difficult to fundamentally resolve the conventional problem.

In short, in the case of attempting to manufacture next-generation substrates for magnetic disks of 750 gigabytes, for example, a further improvement from currently available HDDs is required, in terms of the roughness of the substrate surface as well, and if the surface roughness Ra needs to be 0.1 nm or less, for example, there is a limit to reducing the roughness simply by using a roughness improvement method by means of the conventional technology, and it is ultimately difficult to develop next-generation substrates as described above.

Also, a photomask is used to manufacture a semiconductor apparatus such as LSI with a photolithography method, and in order to realize high-precision transfer of a pattern to a semiconductor substrate, a glass substrate for a mask blank used to manufacture the photomask also needs a further improvement in roughness of the substrate surface.

In view of this, the present invention has been made to resolve such conventional issues, and an object thereof is to provide a method for manufacturing a high-quality magnetic-disk glass substrate with which the surface roughness of a main surface of the glass substrate can be reduced more than with currently available methods, for example, and to provide a method for manufacturing a magnetic disk using this glass substrate.

In view of this, in order to obtain a glass substrate whose surface roughness is reduced more than in currently available glass substrates, the inventor of the present invention has studied a method according to which surface roughness of a glass substrate is reduced in a polishing step, but the surface roughness of the glass substrate is not increased in a cleaning step after polishing. As a result of the studies, the inventor found that use of organic-based particles as the polishing abrasive particles could resolve the above-described issues.

That is, it is conceivable that use of organic-based particles having a hardness lower than that of glass as polishing abrasive particles advances polishing without forming a non-uniform layer altered by processing on the glass surface in the polishing step with a load applied, and therefore it was found that selection of a cleaning liquid with which the roughness of a glass substrate surface after polishing can be suppressed and that does not have etching action on glass can suppress an increase in roughness of a glass substrate surface after cleaning, as a result of which it is possible to achieve a surface roughness Ra of 0.1 nm or less, for example, which is required for next-generation substrates.

Based on the above-described findings, the inventor of the present invention found that the above-described issues can be resolved according to the invention having the following aspects, thus accomplishing the invention.

That is, in order to achieve the above-described objects, the present invention has the following aspects.

(Aspect 1)
A method for manufacturing a glass substrate, including polishing processing for mirror-polishing main surfaces of a glass substrate, in which after the main surfaces of the glass substrate are mirror-polished using a polishing liquid containing organic-based particles as polishing abrasive particles, the glass substrate is cleaned using an organic-based cleaning agent.

(Aspect 2)
The method for manufacturing a glass substrate according to Aspect 1, in which the organic-based particles are made of a styrene-based resin, an acrylic resin, or a urethane-based resin.

(Aspect 3)
The method for manufacturing a glass substrate according to Aspect 1 or 2, in which the organic-based cleaning agent is an organic solvent or an amine compound.

(Aspect 4)
A method for manufacturing a glass substrate, including processing for polishing main surfaces of a glass substrate, in which after the main surfaces of the glass substrate are subjected to polishing processing using a polishing liquid containing organic-based particles as polishing abrasive particles, processing for bringing an organic solvent that can swell the organic-based particles or a portion of the organic-based particles attached to surfaces of the glass substrate into contact with the surfaces of the glass substrate is performed.

(Aspect 5)
The method for manufacturing a glass substrate according to Aspect 4, in which processing is performed in which when a solubility parameter (an SP value) of a monomer component of a resin that constitutes the organic-based particles is given as SP1 and a solubility parameter (an SP value) of the organic solvent is given as SP2, an organic solvent is selected such that SP2/SP1 is in a range of 0.9 to 1.1, and the selected organic solvent is brought into contact with the surfaces of the glass substrate.

(Aspect 6)
The method for manufacturing a glass substrate according to Aspect 5, in which processing is performed in which when a molecular weight of the monomer component of the resin that constitutes the organic-based particles is given as MW1 and a molecular weight of the organic solvent is given as MW2, an organic solvent is selected such that MW2/MW1 is 1.5 or less, and the selected organic solvent is brought into contact with the surfaces of the glass substrate.

(Aspect 7)
The method for manufacturing a glass substrate according to any of Aspects 1 to 6, in which after the main surfaces of the glass substrate are polished using a polishing liquid containing silica abrasive particles as polishing abrasive particles, the main surfaces of the glass substrate are mirror-polished using the polishing liquid containing the organic-based particles as polishing abrasive particles.

(Aspect 8)
The method for manufacturing a glass substrate according to any of Aspects 1 to 7, in which with regard to roughnesses of the main surfaces of the glass substrate before mirror-polishing is performed using the polishing liquid containing the organic-based particles as polishing abrasive particles, an arithmetic average roughness Ra is 0.3 nm or less.

(Aspect 9)
The method for manufacturing a glass substrate according to any of Aspects 1 to 8, in which a particle diameter of the organic-based particles is in a range of 0.5 to 60 μm.

(Aspect 10)

The method for manufacturing a glass substrate according to any of Aspects 1 to 9, in which the glass substrate is a magnetic-disk glass substrate.

(Aspect 11)

A method for manufacturing a magnetic disk, in which at least a magnetic layer is formed on a glass substrate that is obtained with the manufacturing method according to Aspect 10.

According to the present invention, it is possible to manufacture a high-quality glass substrate in which the surface roughness of the glass substrate can be further reduced by mirror-polishing the main surfaces of the glass substrate using a polishing liquid containing organic-based particles as polishing abrasive particles, and selecting an optimal cleaning method after polishing ends makes it possible to suppress an increase in roughness after cleaning, and therefore, a super smooth mirror surface resulting from polishing using the organic-based abrasive particles can be maintained even after cleaning, as a result of which the surface roughnesses of the main surfaces of the glass substrate can be reduced more than with the currently available substrates.

Also, with the above-described aspects of the present invention, it is possible to manufacture a high-quality glass substrate preferable for manufacturing a magnetic disk having a higher recording density than previously available, such as a recording density exceeding 750 gigabytes, for example.

Also, use of the above-described glass substrate makes it possible to manufacture a magnetic disk having a higher recording density as described above.

BRIEF DESCRIPTION OF THE DRAWINGS

FIG. 1 is a longitudinal cross-sectional view of a schematic configuration of a double-side polishing apparatus.

DESCRIPTION OF EMBODIMENTS

Hereinafter, an embodiment of the present invention will be described in detail.

Magnetic-disk glass substrates are usually manufactured through a grinding step, a shape processing step, an edge surface polishing step, a main surface polishing step, a chemical strengthening step, and the like.

The magnetic-disk glass substrate is manufactured by first molding a disk-shaped glass substrate (glass disk) from molten glass by direct pressing. Note that a glass substrate may be obtained by cutting plate glass manufactured with a downdraw method or a float method other than using direct pressing into a predetermined size. Next, grinding for enhancing the dimensional accuracy and shape accuracy is performed on main surfaces of this molded glass substrate. In this grinding step, a double-side grinding apparatus is generally used to grind the main surfaces of the glass substrate with hard abrasive particles such as diamond particles. By grinding the main surfaces of the glass substrate in this manner, the glass substrate is processed so as to have a predetermined substrate thickness and flatness and to obtain a predetermined surface roughness.

After this grinding step ends, the shape processing step and the edge surface polishing step are performed, and the mirror-polishing processing for obtaining a high precision flat surface is then performed. Conventionally, a method for mirror-polishing a glass substrate was performed using a polishing pad made of polyurethane foam or the like while supplying a slurry (polishing liquid) containing a polishing material that is made of a metal oxide such as cerium oxide or colloidal silica.

As described above, the inventor of the present invention found that when attempts were made to manufacture a magnetic disk having a higher recording density than previously available, such as a recording density exceeding 750 gigabytes, for example, it was necessary to reduce the roughness of the substrate surface to less than that of currently available substrates, for example, which can be a factor inhibiting the realization of a further lowering of the flying height by adoption of a magnetic head provided with the above-described DFH control function, for example, and in order to achieve this, a polishing liquid composition containing organic-based particles as polishing abrasive particles is suitable as a polishing liquid that is used in polishing processing.

As described in Aspect 1 above, an embodiment of the present invention is a polishing liquid composition that is applied in polishing processing for polishing main surfaces of a glass substrate used in a magnetic disk, and the composition contains organic-based particles as polishing abrasive particles.

That is, it is conceivable that by using organic-based particles having a lower hardness and a higher elasticity than glass as polishing abrasive particles, polishing advances without forming a non-uniform layer altered by processing on the glass surface in a polishing step with a load applied, and therefore roughness of the surface of a glass substrate that has been polished can be reduced. Moreover, in a cleaning step for removing abrasive particles attached to the surface of the glass substrate after polishing, a cleaning liquid that does not have etching action on glass is selected so as to perform cleaning, and therefore an increase in roughness of the surface of the glass substrate after cleaning can be suppressed.

Performing processing for polishing a glass substrate using a polishing liquid containing the organic-based particles according to the present invention as polishing abrasive particles makes it possible to reduce the surface roughness of the glass substrate surface, or for example, an arithmetic average roughness Ra of 0.1 nm or less, which is required for next-generation substrates, and to manufacture a high-quality glass substrates. Therefore, in the case of manufacturing a magnetic disk having a higher recording density than previously available, such as a recording density exceeding 750 gigabytes, for example, it is possible to manufacture a high-quality glass substrate that is suitable for the realization of a further lowering of the flying height to a lower flying height than previously available.

In short, in the present invention, processing for polishing main surfaces of a glass substrate using a polishing liquid containing organic-based particles as polishing abrasive particles is, in other words, processing for reducing roughness of a surface of the glass substrate.

The polishing liquid applied to mirror-polishing processing in the present invention is a mixture of polishing material (polishing abrasive particles) and water, which is a solvent, and the polishing liquid contains a pH adjusting agent for adjusting the pH of the polishing liquid and other additive agents as needed.

The above-described polishing liquid contains the organic-based particles as polishing abrasive particles. Also, the present invention is characterized by usage of only organic-based particles as polishing abrasive particles. The organic-based particles are particles made of an organic material such as a resin, and more specifically, are particles made of an elastic resin having a lower hardness than that of glass. Specifically, it is preferable that the material of organic-based particles is a resin material such as an acryl-based resin, urethane-based resin, or styrene-based resin. The acryl-based resin is a polymer obtained by the polymerization of an acrylic monomer (polymethyl methacrylate (PMMA), for example), a copolymer including an acrylic monomer as a main component, or the like. Also, the urethane-based resin is a urethane resin obtained by the polymerization of a urethane monomer, a copolymer including a urethane monomer as a main component, or the like. Also, the styrene-based resin is a styrene resin obtained by the polymerization of a styrene monomer, a copolymer including a styrene monomer as a main component, or the like. Among these, in particular, the organic-based particles are preferably made of the acrylic resin or the urethane-based resin, because such organic-based particles have a good dispersibility into water and are easily made into a slurry.

In order to rotate a surface plate with a load applied, the organic-based particles need to have low friction, and therefore the shape of the organic-based particles is preferably substantially spherical, and resin beads having the same particle diameter are desirable.

Note that the above-described organic-based particles may be a copolymer obtained by the polymerization of a plurality of types of monomers. For example, two or more of an acrylic monomer, a urethane monomer, and a styrene monomer may be selected so as to perform polymerization. Also, various organic-based particles may be mixed.

It is preferable to use the above-described organic-based particles having a particle diameter of 0.5 to 60 μm. If the particle diameter is less than 0.5 μm, it is difficult to obtain the effect of reducing the surface roughness of a glass substrate. Also, if the particle diameter exceeds 60 μm, the viscosity of a polishing liquid increases, and it is difficult to obtain a good effect of reducing the surface roughness.

In the present invention, in order to achieve a greater reduction in surface roughness, it is preferable to use the organic-based particles having a particle diameter of 1.5 to 30 μm, and more preferably having a particle diameter of 10 to 25 μm.

Note that in the case where the polishing liquid contains very small organic particles having a particle diameter of 0.1 μm or less, or a macromolecular compound such as a water-soluble macromolecule, the macromolecular compound is likely to be adsorbed and remain on a glass substrate surface, and therefore it will be difficult to obtain a clean surface after cleaning processing, which is not preferable. The particle diameter of organic-based particles included in the polishing liquid of the present invention is approximately 20 or more times the particle diameter (25 nm, for example) of polishing abrasive particles such as colloidal silica used in final polishing performed on the main surfaces of substrates in recent years, and therefore the organic-based particles are easily removed in the cleaning processing, and a clean substrate surface can be easily obtained in final cleaning.

Note that in the present invention, the particle diameter of the above-described organic-based particles is obtained by observing particles with a scanning electron microscope (SEM), selecting 100 particles, measuring the maximum sizes of the 100 particles, and finding an arithmetic mean value thereof.

Also, although there is no particular limitation on the concentration of abrasive particles in the polishing liquid, from the viewpoint of surface quality after polishing and processing rate, the concentration of abrasive particles can be set in a range of 0.1 to 5 wt %. In particular, a range of 1 to 3 wt % is preferable.

Also, from the viewpoint of reducing scratches caused by sticking of a resin due to dryness, a polishing liquid used in the present invention may contain at least one type of additive agent selected from a material exhibiting a lubricating effect and a material exhibiting a moisturizing effect.

Specific examples of such an additive agent are glycols (ethylene glycol, propylene glycol, and hexylene glycol), amines (monoethanolamine, diethanolamine, triethanolamine, and isopropanolamine), carboxylic acids, mineral oils, water-soluble oil emulsions, polyethylenimine, boric acid, amides, triazines, benzothiazole, benzotriazole, ethers, and the like.

Although there is no particular limitation on the addition amount of the above-described additive agent, but from the viewpoint of processability, it is preferable that the addition amount thereof is in a range of 0.01 to 1 wt %.

Also, the above-described polishing liquid whose pH is adjusted to 4 to 8, for example, is preferably used. If the pH is less than 4, corrosion of resin abrasive particles is a concern. Also, if the pH exceeds 8, the cleaning properties after polishing decrease and foreign matter defects are likely to occur.

There is no particular limitation on the polishing method in polishing processing using a polishing liquid containing organic-based particles of the present invention as polishing abrasive particles, and similarly to the conventional method, it is sufficient that surfaces of a glass substrate are polished to have mirror surfaces by bringing the glass substrate and polishing pads into contact with each other and moving the polishing pads and the glass substrate relative to each other while supplying the polishing liquid containing polishing abrasive particles of the organic-based particles, for example. As the polishing pad, it is possible to apply a polishing pad that is similar to the polishing pad made of polyurethane foam, for example, which is applied in mirror-polishing processing in which the conventional colloidal silica abrasive particles are used. However, in the mirror-polishing processing using the polishing abrasive particles of organic-based particles of the present invention, there is no limitation on the hardness of the polishing pad, unlike with the silica abrasive particles. This is because the resin abrasive particles themselves have cushioning properties of the pad. Therefore, in the mirror-polishing processing using polishing abrasive particles of organic-based particles of the present invention, it is possible to apply a polishing pad harder than the polishing pad made of polyurethane foam, for example, which is applied in the mirror-polishing processing using the conventional colloidal silica abrasive particles. If a hard polishing pad is used, waviness of a substrate surface can be reduced.

For example, FIG. 1 is a longitudinal cross-sectional view showing a schematic configuration of a planetary double-side polishing apparatus that can be used in the step of mirror-polishing a glass substrate. The double-side polishing apparatus shown in FIG. 1 includes a sun gear 2, an internal gear 3 arranged concentrically on the outside of the sun gear 2, a carrier 4 that is engaged with the sun gear 2 and the internal gear 3 and revolves and rotates in response to the rotation of the sun gear 2 or the internal gear 3, an upper surface plate 5 and a lower surface plate 6 to which polishing pads 7 that are capable of holding a product 1 to be polished that is held by the carrier 4 are respectively attached, and a polishing liquid supplying portion (not shown) that supplies the polishing liquid between the upper surface plate 5 and the lower surface plate 6.

At the time of polishing processing, by using such a double-side polishing apparatus, the product 1 to be polished, that is, the glass substrate, which is held by the carrier 4, is held between the upper surface plate 5 and the lower surface plate 6, and then both the upper and lower surfaces of the product 1 to be polished are polished while the polishing liquid constituted by the polishing liquid composition of the present invention is supplied between the polishing pads 7 of the upper and lower surface plates 5 and 6 and the product 1 to be polished, and the carrier 4 revolves and rotates in response to the rotation of the sun gear 2 and the internal gear 3.

Note that it is preferable to apply the load (processing surface pressure) in a range of 50 gf/cm$^2$ or more to 200 gf/cm$^2$ or less. A load of less than 50 gf/cm$^2$ is not preferable because the processability (polishing rate) of the glass substrate is reduced. Also, a load of more than 200 gf/cm$^2$ is not preferable because processing becomes unstable.

By using the polishing liquid constituted by the polishing liquid composition of the present invention and polishing main surfaces of a glass substrate at the processing surface pressure in the above-described range, the surface roughness can be further reduced.

In general, conventionally, the step of mirror-polishing the main surfaces of a glass substrate is performed over two stages, namely the polishing step (first polishing step) for removing marks and warping remaining from the grinding step and the finishing-polishing step (second polishing step) for finishing the surface roughnesses of the main surfaces of the glass substrate into smooth mirror surfaces while maintaining flat surfaces obtained in this first polishing step, but in the present invention, final finishing-polishing, in which a polishing liquid containing organic particles of the present invention as polishing abrasive particles is applied, is preferably performed after this finishing-polishing step.

Although the above-described conventional finishing-polishing step is usually performed using colloidal silica abrasive particles having an average particle diameter of about 20 to 40 nm, a further reduction in surface roughness can be achieved by performing final finishing-polishing in which a polishing liquid containing the organic-based particles of the present invention as polishing abrasive particles is applied, after conventional finishing-polishing. As described before, if final finishing-polishing is performed using colloidal silica abrasive particles with particle diameters smaller than the above-described particle diameter, it is difficult to further reduce the surface roughness.

As described above, it is preferable that after main surfaces of the glass substrate are polished using a polishing liquid containing colloidal silica abrasive particles as polishing abrasive particles, the main surfaces of the glass substrate are mirror-polished using a polishing liquid containing organic-based particles of the present invention as polishing abrasive particles. In other words, it is preferable to use a polishing liquid containing the organic-based particles of the present invention as polishing abrasive particles to mirror-polish the main surfaces of a glass substrate having a layer altered by processing.

With regard to roughness of a main surface of a glass substrate before the main surface of the glass substrate is mirror-polished using a polishing liquid containing the organic-based particles of the present invention as polishing abrasive particles, if the arithmetic mean roughness Ra is 0.3 nm or less, it is possible to further reduce surface roughness of the substrate through polishing processing using the organic-based particles of the present invention as polishing abrasive particles, and to finish the main surface to an Ra of 0.1 nm or less, for example.

Cleaning is performed to remove abrasive particles attached to the surfaces of the glass substrate after the main surfaces of the glass substrate are mirror-polished using a polishing liquid containing organic-based particles according to the present invention as polishing abrasive particles, and in this case, the glass substrate is preferably cleaned using an organic-based cleaning agent. Although the organic-based cleaning agent can favorably dissolve (or swell) and remove organic-based particles, which are the polishing abrasive particles, the organic-based cleaning agent does not have etching action or leaching action on glass at all. That is, cleaning can be performed with a cleaning liquid that does not have etching action or leaching action on glass being selected, and therefore it is possible to suppress an increase in roughness of the surfaces of the glass substrate after cleaning. Therefore, very low roughness (high smoothness) obtained by mirror-polishing processing in which organic-based particles are applied as polishing abrasive particles can also be maintained as is after cleaning. As a result, the surface roughness of the main surfaces of the glass substrate can be reduced more than with currently available methods, and accordingly a high-quality glass substrate can be manufactured.

An organic solvent or an organic-based cleaning agent such as an amine compound is suitable as a cleaning agent suitable for the organic-based particles in the present invention.

Examples of the above-described organic solvent include aromatic hydrocarbons such as toluene, xylene, and styrene, chlorinated aromatic hydrocarbons such as chlorobenzene and ortho-chlorobenzene, chlorinated aliphatic hydrocarbons such as dichloromethane, trichloromethane, tetrachloromethane, 1,2-dichloroethane, 1,1,1-trichloroethane, 1,1,2,2-tetrachloroethane, 1,2-dichloroethane, trichloroethylene, and tetrachloroethylene, alcohols such as methanol, isopropyl alcohol, 1-butanol, 2-butanol, isobutyl alcohol, isopentyl alcohol, 3-methoxy-3-methyl butanol, and 2-isopropoxyethanol, esters such as methyl acetate, ethyl acetate, propyl acetate, isopropyl acetate, butyl acetate, isobutyl acetate, pentyl acetate, isopentyl acetate, 1-methoxypropyl-2-acetate, and 3-methoxy-3-methyl-1-butyl acetate, ethers such as ethyl ether, 1,4-dioxane, tetrahydrofuran, ethylene glycol monomethyl ether, and dipropylene glycol monomethyl ether, ketones such as acetone, methyl ethyl ketone, methyl butyl ketone, and methyl isobutyl ketone, Cellosolves such as cellosolve, methyl cellosolve, butyl cellosolve, and cellosolve acetate, alicyclic hydrocarbons such as cyclohexanone, methyl cyclohexanone, cyclohexanol, and methyl cyclohexanol, aliphatic hydrocarbons such as n-hexane, cresol, carbon disulfide, and N, N-dimethylformamide.

Also, examples of the above-described amine compounds include ethylenediamine, diethylenetriamine, triethylenetetramine, tetraethylenepentamine, pentaethylenehexamine, 2-[(2-aminoethyl)amino]ethanol, 2-[methyl [2-(dimethylamino)ethyl]amino]ethanol, 2,2'-(ethylene bisimino) bisethanol, N-(2-hydroxyethyl)-N'-(2-aminoethyl)ethylenediamine, 2,2'-(2-aminoethyl imino)diethanol, N1,N4-bis (hydroxyethyl)diethylenetriamine, N1,N7-bis (hydroxyethyl)diethylenetriamine, 1,3-diamino-2-propanol, piperazine, 1-methylpiperazine, 3-(1-piperazinyl)-1-amine, 1-(2-aminoethyl)piperazine, 4-methylpiperazine-1-amine, 1-piperazine methanamine, 4-ethyl-1-piperazine amine, 1-methyl-4-(2-aminoethyl)piperazine, and 1-(2-hydroxyethyl)piperazine.

As a result of further studies on organic-based cleaning agents such as that described above, the inventor of the present invention found that after main surfaces of a glass substrate are subjected to polishing processing using a polishing liquid containing organic-based particles as polishing abrasive particles, use of an organic solvent that can swell organic-based particles or a portion thereof attached to the surfaces of the glass substrate is particularly preferable. Here, swelling is a phenomenon in which organic-based particles expand through absorbing an organic solvent. Also, the above-described portion of the organic-based particles means a portion of the organic-based particles that occur due to the organic-based particles being damaged at the time of the polishing processing and are attached to the surfaces of the glass substrate.

Therefore, the present invention is to provide a method for manufacturing a magnetic-disk glass substrate according to Aspect A below.

(Aspect A)

A method for manufacturing a magnetic-disk glass substrate including processing for polishing main surfaces of a glass substrate, in which after the main surfaces of the glass substrate are subjected to the polishing processing using a polishing liquid containing organic-based particles as polishing abrasive particles, processing for bringing an organic solvent that can swell the organic-based particles or a portion of the organic-based particles attached to surfaces of the glass substrate into contact with the surfaces of the glass substrate is performed.

Also, as a result of further studies, the inventor of the present invention found that a ratio of a solubility parameter (SP value) of an organic solvent with respect to a solubility parameter (SP value) of a monomer component of a resin that constitutes the organic-based particles has a correlation with the cleaning properties of the organic solvent, and it is particularly preferable to select an organic solvent in which the ratio is in a specific range, from the viewpoint of improving the cleaning properties of the organic-based particles.

Specifically, when a solubility parameter (SP value) of a monomer component of a resin that constitutes the organic-based particles is given as SP1 and a solubility parameter (SP value) of an organic solvent is given as SP2, processing is preferably performed in which an organic solvent is selected such that SP2/SP1 is in a range of 0.9 to 1.1 and the selected organic solvent is brought into contact with surfaces of a glass substrate that has undergone polishing processing.

That is, processing using an organic solvent having an SP value that is relatively close to that of the monomer component of a resin that constitutes the organic-based particles is optimal as a cleaning method performed after the polishing processing (in particular, final finishing-polishing) is performed using the organic-based particles. By bringing the organic solvent having an SP value that is relatively close to that of the monomer component of the resin that constitutes the organic-based particles into contact with the surfaces of the substrate, the organic-based particles attached to the surfaces of the substrate are favorably swollen, and therefore even organic-based particles (or a portion thereof) that are strongly attached to the surfaces of the substrate are likely to be separated from the surfaces of the substrate due to shifting in the interface with the substrate.

Note that the above-described solubility parameter (Solubility Parameter) indicates a so-called "SP value" defined by the regular solution theory introduced by Hildebrand, and is a value obtained based on the following equation.

$$\text{Solubility parameter } \delta \ [(\text{cal/cm}^3)^{1/2}] = (\Delta E/V)^{1/2}$$

(where $\Delta E$ indicates molar vaporization energy [cal] and V indicates molar volume [cm$^3$].)

Also, the inventor of the present invention found that a ratio of the molecular weight of an organic solvent with respect to the molecular weight of a monomer component of the resin that constitutes organic-based particles also has a correlation with the cleaning properties of the organic solvent, and selecting an organic solvent in which the ratio is in a specific range is preferable from the viewpoint of improving the cleaning properties of the organic-based particles.

Specifically, when the molecular weight of the monomer component of the resin that constitutes the organic-based particles is given as MW1 and the molecular weight of the organic solvent is given as MW2, processing is preferably performed in which an organic solvent is selected such that MW2/MW1 is 1.5 or less and the selected organic solvent is brought into contact with the surfaces of the glass substrate that has undergone the polishing processing. More preferably, MW2/MW1 is in a range of 0.5 to 1.5.

Also, in the present invention, the molecular weight of the above-described organic solvent is preferably 60 or more.

Therefore, in the present invention, it is most preferable to select an organic solvent such that the above-described SP2/SP1 is in a range of 0.9 to 1.1 and the above-described MW2/MW1 is 1.5 or less.

Note that in the case where the organic-based particles are made of a copolymer resin material containing a plurality of monomer components, it is possible to select an organic solvent such that with regard to any monomer components, the above-described correlation is satisfied.

In the present invention, it is preferable that the (type of) glass constituting the glass substrate is aluminosilicate glass containing $SiO_2$ as a main component and alumina. Mirror-polishing the surface of the glass substrate in which such glass is used can yield a smooth mirror-finished surface, and the post-processing strength is favorable. Also, the strength can be further increased by performing chemical strengthening.

Also, the above-described glass may be crystallized glass or amorphous glass. By using amorphous glass, when the amorphous glass is made into a glass substrate, a further reduction in the surface roughness of the main surface can be achieved.

Aluminosilicate glass containing $SiO_2$ in an amount of 58 wt % or more and 75 wt % or less, $Al_2O_3$ in an amount of 5 wt % or more and 23 wt % or less, $Li_2O$ in an amount of 3 wt % or more and 10 wt % or less, and $Na_2O$ in an amount of 4 wt % or more and 13 wt % or less as main components (it should be noted that aluminosilicate glass that does not contain phosphorus oxide) can be used as such aluminosilicate glass. Furthermore, it is possible to use phosphorus oxide-free amorphous aluminosilicate glass that contains an oxide of an alkaline earth metal in an amount of 5 wt % or more and as main components $SiO_2$ in an amount of 62 wt % or more and 75 wt % or less, $Al_2O_3$ in an amount of 5 wt % or more and 15 wt % or less, $Li_2O$ in an amount of 4 wt % or more and 10 wt % or less, $Na_2O$ in an amount of 4 wt % or more and 12 wt % or less, and $ZrO_2$ in an amount of 5.5 wt % or more and 15 wt % or less, and has an $Na_2O/ZrO_2$ weight ratio of 0.5 or more and 2.0 or less and an $Al_2O_3/ZrO_2$ weight ratio of 0.4 or more and 2.5 or less, for example.

In addition, there are cases in which heat resistance is required as a characteristic of a next-generation substrate (substrate that is used in a magnetic disk applicable to a heat assisted magnetic recording method, for example). As heat resistant glass in this case, it is preferable to use, for example, glass that contains an oxide of an alkaline earth metal in an amount of 5 wt % or more and $SiO_2$ in an amount of 50 to 75 mol %, $Al_2O_3$ in an amount of 0 to 6 mol %, BaO in an amount of 0 to 2 mol %, $Li_2O$ in an amount of 0 to 3 mol %, ZnO in an amount of 0 to 5 mol %, $Na_2O$ and $K_2O$ in a total amount of 3 to 15 mol %, MgO, CaO, SrO and BaO in a total amount of 14 to 35 mol %, and $ZrO_2$, $TiO_2$, $La_2O_3$, $Y_2O_3$, $Yb_2O_3$, $Ta_2O_5$, $Nb_2O_5$ and $HfO_2$ in a total amount of 2 to 9 mol %, and that has a molar ratio [(MgO+CaO)/(MgO+CaO+SrO+BaO)] in a range of 0.85 to 1 and a molar ratio [$Al_2O_3$/(MgO+CaO)] in a range of 0 to 0.30.

Also, it is preferable to use quartz as glass for a mask blank substrate.

In the present invention, the surface of the glass substrate that has undergone the final finishing-polishing processing in which the organic-based abrasive particles of the present invention are applied is preferably a mirror surface having an arithmetic mean surface roughness Ra of 0.1 nm or less, and in particular a mirror surface having an arithmetic mean surface roughness Ra of 0.06 nm or less. Furthermore, the surface of the glass substrate is a mirror surface that preferably has a maximum peak height Rp of 1.0 nm or less. Note that Ra and Rp of the present invention refer to roughness based on Japanese Industrial Standard (JIS) B0601.

The surface roughness in the present invention is the surface roughness of a surface shape that is measured using an atomic force microscope (AFM) in a 1 µm×1 µm range at a resolution of 256×256 pixels, for example.

In the present invention, chemical strengthening processing may be performed before or after the mirror-polishing processing step, for example. As a method for the chemical strengthening processing, it is preferable to use, for example, a low-temperature ion-exchange method in which ion exchange is performed in a temperature range not exceeding the glass transition point, at a temperature of 300° C. or more and 400° C. or less, for example. The chemical strengthening processing is processing in which the glass substrate is brought into contact with a molten chemical strengthening salt so that an alkali metal element having a relatively large atomic radius in the chemical strengthening salt and an alkali metal element having a relatively small atomic radius in the glass substrate are ion-exchanged, whereby the alkali metal element having a large atomic radius permeates through the surface layer of the glass substrate, and compressive stress is generated on the surfaces of the glass substrate. A glass substrate that has undergone the chemical strengthening has excellent impact resistance, and therefore it is particularly preferable to mount the glass substrate in an HDD for mobile use, for example. An alkali metal nitrate such as potassium nitrate or sodium nitrate can be preferably used as the chemical strengthening salt.

As described above, the magnetic-disk glass substrate that is manufactured according to the present invention is suitable as a glass substrate that is used in a magnetic disk provided in a HDD provided with a DFH magnetic head that can realize an extremely low flying height.

In addition, the present invention provides a method for manufacturing a magnetic disk using the above-described magnetic-disk glass substrate. The magnetic disk is manufactured by forming at least a magnetic layer (magnetic recording layer) on the magnetic-disk glass substrate according to the present invention. A hexagonal-system CoCrPt-based or CoPt-based ferromagnetic alloy with a large anisotropic magnetic field can be used as a material of the magnetic layer. It is preferable to form the magnetic layer on the glass substrate by a sputtering method such as a DC magnetron sputtering method.

Also, a protective layer and a lubricant layer may be formed in this order on the magnetic layer. An amorphous hydrogenated carbon-based protective layer is suitable as the protective layer. The protective layer can be formed by a plasma CVD method, for example. As the lubricant layer, a lubricant that has a functional group at the terminal of the main chain of a perfluoropolyether compound can be used. The lubricant layer can be applied and formed by a dipping method.

Use of a highly smooth glass substrate obtained according to the present invention makes it possible to obtain a highly reliable magnetic disk in which problems such as recording and reproduction errors and head crash do not occur even when recording and reproduction are performed using a DFH head. Therefore, the present invention is suitable for manufacturing a magnetic disk having a higher recording density than previously available, such as a recording density exceeding 750 gigabytes, for example.

Although the case where the present invention is mainly applied to processing for polishing a magnetic-disk glass substrate has been described in the above-described embodiment, the case where the present invention is applied to processing for polishing a glass substrate for a mask blank is similar thereto.

WORKING EXAMPLES

Hereinafter, the embodiment of the present invention will be described in detail by way of working examples. Note that the present invention is not limited to the following working examples.

Working Examples 1 to 7, Comparative Examples 1 to 4

A magnetic-disk glass substrate was manufactured through (1) a rough grinding step, (2) a shape processing step, (3) a precision grinding step, (4) an edge surface polishing step, (5) a main surface polishing step, (6) a chemical strengthening step, (7) a main surface finishing-polishing step, and (8) a main surface final finishing-polishing step, that will be described below.

(1) Rough Grinding Step

First, a disk-shaped glass substrate made of aluminosilicate glass and having a diameter of 66 mmφ and a thickness of 1.0 mm was obtained from molten glass by direct pressing using upper, lower, and drum molds. Note that a glass substrate may be obtained by cutting plate glass manufactured with a downdraw method or a float method other than using direct pressing into a predetermined size.

Next, in order to improve dimensional accuracy and shape accuracy, the rough grinding step was performed on this glass substrate. This rough grinding step was performed using a double-side grinding apparatus.

(2) Shape Processing Step

Next, a cylindrical grindstone was used to create a hole in the central portion of the glass substrate and an outer circumferential edge surface was ground to have a diameter of 65 mmφ, whereafter predetermined chamfering was performed on the outer circumferential edge surface and an inner circumferential edge surface.

(3) Precision Grinding Step

This precision grinding step was performed using a double-side grinding apparatus.

(4) Edge Surface Polishing Step

Next, the edge surfaces (inner and outer circumferential edge surfaces) of the glass substrate were polished by brushing while the glass substrate was rotated. After undergoing the above-described edge surface polishing, the surfaces of the glass substrate were cleaned.

(5) Main Surface Polishing Step

Next, the main surface polishing step was performed using a double-side polishing apparatus. In the double-side polishing apparatus, the glass substrate that is held by a carrier is tightly placed between the upper and lower surface plates to which polishing pads are attached, the carrier is engaged with the sun gear and the internal gear, and the glass substrate is pressed between the upper and lower surface plates. Then, a polishing liquid is supplied between the polishing pads and the glass substrate surfaces to be polished, the upper and lower surface plates are rotated, and thus the glass substrate revolves while rotating on the surface plates so that both surfaces of the glass substrate are polished simultaneously. Specifically, the polishing step was performed using a hard polisher (hard urethane foam) as a polisher. A liquid in which cerium oxide was dispersed as a polishing agent was used as the polishing liquid. After undergoing the above-described polishing step, the glass substrate was cleaned and dried.

(6) Chemical Strengthening Step

Next, after undergoing the above-described cleaning, the glass substrate was subjected to the chemical strengthening. Chemical strengthening was performed by preparing a chemical strengthening liquid obtained by mixing potassium nitrate and sodium nitrate, heating this chemical strengthening liquid to 380° C., and immersing the glass substrate that was cleaned and dried in the heated chemical strengthening liquid for approximately 4 hours.

(7) Main Surface Finishing-Polishing Step

Next, the finishing-polishing step was performed using the same double-side polishing apparatus that was used in the above-described main surface polishing step, and polishing pads (polyurethane foam) with a soft polisher (suede) were used instead as the polisher. This finishing-polishing step is mirror-polishing processing for finishing the main surfaces of the glass substrate to smooth mirror surfaces each having a surface roughness Ra of about 0.2 nm or less, for example, while maintaining the flat surfaces obtained in the initial polishing step described above. A liquid obtained by dispersing colloidal silica (particle diameter: 18 nm) in water was adjusted to be acidic and used as the polishing liquid. After undergoing the above-described finishing-polishing step, the glass substrate was cleaned and dried.

(8) Main Surface Final Finishing-Polishing Step

A polishing liquid was prepared by adding, as polishing abrasive particles, 1 wt % organic-based particles that had a particle diameter of 1.3 µm and were made of a styrene resin as a raw material to water, and adjusting the mixture to have a pH of 2 to 10. The polishing step was performed with a polishing method similar to that of the above-described finishing-polishing step. After undergoing the above-described final finishing-polishing step, the glass substrate was cleaned and dried.

As a method for cleaning after this final finishing-polishing ends, acetone having water content of 1.0 wt % or less was used in a cleaning liquid, and cleaning was performed by applying ultrasound in a state in which the glass substrate was immersed in the cleaning liquid.

Surface roughnesses (Ra) of main surfaces of a magnetic-disk glass substrate after cleaning was measured with an atomic force microscope (AFM), and the results are shown in Table 1 below. Also, the number of defects resulting from foreign matter attaching to main surfaces of a glass substrate after cleaning was counted using a 1 µm×1 µm image obtained with an AFM, and the results are also shown in Table 1.

Also, final finishing-polishing and cleaning were performed so as to obtain a magnetic-disk glass substrate (Working Example 2) similarly to Working Example 1 above, except that polishing abrasive particles that are used in the above-described main surface final finishing-polishing step were changed to organic-based particles having a particle diameter of 1.5 µm, which were obtained by using an acrylic resin as a raw material.

Also, final finishing-polishing and cleaning were performed similarly to Working Example 1 above, except that polishing abrasive particles that are used in the above-described main surface final finishing-polishing step were changed to organic-based particles having a particle diameter of 2.0 µm, which were obtained by using a urethane resin as a raw material, as a result of which a magnetic-disk glass substrate (Working Example 3) was obtained.

Also, cleaning after final finishing-polishing ended was performed similarly to Working Example 2 above, except that as a cleaning method after the above-described main surface final finishing-polishing ends, the cleaning liquid was changed to isopropyl alcohol having a water content of 1.0 wt % or less, and thus a magnetic-disk glass substrate (Working Example 4) was obtained.

Also, cleaning after final finishing-polishing ended was performed similarly to Working Example 3 above, except that as a cleaning method after the above-described main surface final finishing-polishing ended, the cleaning liquid was changed to isopropyl alcohol having a water content of 1.0 wt % or less, and thus a magnetic-disk glass substrate (Working Example 5) was obtained.

Also, cleaning after final finishing-polishing ended was performed similarly to Working Example 2 above, except that as a cleaning method after the above-described main surface final finishing-polishing ends, the cleaning liquid was changed to ethylenediamine having a water content of 1.0 wt % or less, and thus a magnetic-disk glass substrate (Working Example 6) was obtained.

Also, as a cleaning method after the above-described main surface final finishing-polishing ends, cleaning after final finishing-polishing ends was performed similarly to Working Example 3 above, except that the cleaning liquid was changed to ethylenediamine having a water content of 1.0 wt % or less, and thus a magnetic-disk glass substrate (Working Example 7) was obtained.

Also, cleaning after final finishing-polishing ended was performed similarly to Working Example 2 above, except that as a cleaning method after the above-described main surface final finishing-polishing ends, the cleaning liquid was changed to water (ultrapure water), and thus a magnetic-disk glass substrate (Comparative Example 1) was obtained.

Also, cleaning after final finishing-polishing ended was performed similarly to Working Example 2 above, except that as a cleaning method after the above-described main surface final finishing-polishing ends, the cleaning liquid was changed to potassium hydroxide having a concentration of 0.01 to 1 mol/L, and thus a magnetic-disk glass substrate (Comparative Example 2) was obtained.

Also, cleaning after final finishing-polishing ended was performed similarly to Working Example 2 above, except that as a cleaning method after the above-described main surface final finishing-polishing ends, the cleaning liquid was changed to sulfuric acid having a concentration of 0.01 to 1 mol/L, and thus a magnetic-disk glass substrate (Comparative Example 3) was obtained.

Also, final finishing-polishing and cleaning were performed similarly to Working Example 4 above, except that polishing abrasive particles used in the above-described main surface final finishing-polishing step were changed to colloidal silica abrasive particles having a particle diameter of 0.02 μm, and thus a magnetic-disk glass substrate (Comparative Example 4) was obtained.

Surface roughnesses of main surfaces of the magnetic-disk glass substrates obtained in Working Examples 2 to 7 and Comparative Examples 1 to 4 above were measured similarly to the above, the number of defects resulting from foreign matter attaching to main surfaces of a glass substrate after cleaning was counted, and the results are also collectively shown along with Working Example 1 in Table 1.

TABLE 1

| Table 1 | Type of abrasive particles in final finishing-polishing | Cleaning liquid | Ra [nm] | Number of foreign matter attachment defects [count number] |
|---|---|---|---|---|
| Work. Ex. 1 | styrene | acetone | 0.08 | 0 |
| Work. Ex. 2 | acryl | acetone | 0.09 | 0 |
| Work. Ex. 3 | urethane | acetone | 0.10 | 0 |
| Work. Ex. 4 | acryl | IPA | 0.09 | 0 |
| Work. Ex. 5 | urethane | IPA | 0.10 | 0 |
| Work. Ex. 6 | acryl | ethylene diamine | 0.09 | 0 |
| Work. Ex. 7 | urethane | ethylene diamine | 0.10 | 0 |
| Comp. Ex. 1 | acryl | ultrapure water | 0.10 | 18 |
| Comp. Ex. 2 | acryl | potassium hydroxide | 0.12 | 0 |
| Comp. Ex. 3 | acryl | sulfuric acid | 0.17 | 0 |
| Comp. Ex. 4 | silica | IPA | 0.39 | 50 |

As shown in Table 1 above, it was confirmed that with regard to the effect that the cleaning method used after final finishing-polishing was performed using organic-based particles as polishing abrasive particles has on the post-cleaning surface roughness of a glass substrate, with only ultrapure water cleaning (Comparative Example 1), for example, surface roughness after cleaning was unlikely to increase, but many defects resulting from foreign matter attachment occurred and it was confirmed that cleaning was not sufficient. Also, with alkaline cleaning (Comparative Example 2) and acid cleaning (Comparative Example 3), foreign matter attachment defects were not confirmed and it was confirmed that surface roughness after cleaning increased significantly. Also, if final finishing-polishing using colloidal silica even more minute than in finishing-polishing is performed (Comparative Example 4), the surface roughnesses of the main surfaces increase, and finally Ra cannot be reduced to 0.1 nm or less, for example. Moreover, it was confirmed that many defects resulting from foreign matter attaching to the surfaces of the substrates after cleaning occurred, and colloidal silica abrasive particles are not removed with an organic-based cleaning agent.

In contrast, if an organic-based cleaning agent such as an organic solvent or an amine compound was used in a cleaning method after the final finishing-polishing using organic-based particles as polishing abrasive particles, the surface roughness after cleaning was unlikely to increase, and foreign matter attachment defects were not confirmed. That is, it is understood that cleaning using an organic-based cleaning agent is optimal as the cleaning method after final finishing-polishing was performed using organic-based particles as polishing abrasive particles.

Working Examples A to G

A magnetic-disk glass substrate was obtained similarly to Working Example 1 above, except that using organic-based particles having a particle diameter of 20 μm, which were obtained by using a polymethyl methacrylate (PMMA) resin (monomer component is methyl methacrylate) as a raw material, were used as the polishing abrasive particles that are used in the above-described main surface final finishing-polishing step, and processing for bringing organic solvents shown in Table 2 below into contact with surfaces of the glass substrates was performed as a cleaning method after the above-described main surface final finishing-polishing.

The surface roughnesses (Ra) of the main surfaces of the magnetic-disk glass substrates after cleaning were measured with an atomic force microscope (AFM), and the results are shown in Table 2 below. Also, defects resulting from foreign matter attaching to the main surfaces of a glass substrate after cleaning were detected using a 10 μm×10 μm image obtained with an AFM, the attached foreign matter was analyzed, and the number of pieces of foreign matter derived from the above-described PMMA organic-based particles was counted as the number of foreign matter defects, and the results are also shown in Table 2. The measurement area of this AFM is 100 times wider than that of Working Example 1, and allows for a stricter evaluation.

Note that the SP value of methyl methacrylate, which is the monomer component of the above-described PMMA organic-based particles, is 9.1 (SP1) and the molecular weight is 100 (MW1), and therefore SP2/SP1 and MW2/MW1 in each organic solvent were obtained based on these values and are shown in Table 2.

TABLE 2

| | Organic solvent | | | | | Ra [nm] | Number of foreign matter defects [count number] |
|---|---|---|---|---|---|---|---|
| | Name | SP value | Molecular weight (MW) | SP2/SP1 | MW2/MW1 | | |
| Work. Ex. A | toluene | 8.9 | 92 | 0.98 | 0.92 | 0.07 | 0 |
| Work. Ex. B | ethyl acetate | 9.1 | 88 | 1.00 | 0.88 | 0.07 | 0 |
| Work. Ex. C | methyl ethyl ketone | 9.3 | 72 | 1.02 | 0.72 | 0.08 | 0 |

TABLE 2-continued

| | Organic solvent | | | | Ra [nm] | Number of foreign matter defects [count number] |
|---|---|---|---|---|---|---|
| | Name | SP value | Molecular weight (MW) | SP2/SP1 | MW2/MW1 | | |
| Work. Ex. D | hexane | 7.3 | 86 | 0.80 | 0.86 | 0.07 | 8 |
| Work. Ex. E | isopropyl alcohol | 11.5 | 60 | 1.26 | 0.60 | 0.07 | 7 |
| Work. Ex. F | ethyl alcohol | 12.7 | 46 | 1.40 | 0.46 | 0.08 | 9 |
| Work. Ex. G | 3-methoxy-3-methyl-1-butyl acetate | 9.2 | 160 | 1.01 | 1.60 | 0.08 | 4 |

As shown in the results of Table 2 above, in the cleaning method after the final finishing-polishing was performed using organic-based particles as polishing abrasive particles, if an organic solvent was selected such that SP2/SP1, which is the ratio of an SP value of an organic solvent with respect to an SP value of a monomer component of a resin that constitutes organic-based particles, is in a range of 0.9 to 1.1, and cleaning processing was performed using the selected organic solvent, surface roughness after cleaning was unlikely to increase and foreign matter attachment defects derived from the organic-based particles were not confirmed. That is, cleaning using an organic solvent having an SP value that is relatively close to that of a monomer component of a resin that constitutes the organic-based particles is optimal as the cleaning method after final finishing-polishing using organic-based particles is performed.

Also, based on the results of Table 2 above, it is understood that it is also preferable to select an organic solvent such that MW2/MW1, which is the ratio of the molecular weight of an organic solvent with respect to the molecular weight of a monomer component of a resin that constitutes organic-based particles, is in a range of 0.5 to 1.5, and to perform cleaning processing using this selected organic solvent.

Also, compared to Working Example E and Working Examples 4 and 5 (both are IPA), as a result of an increase in particle diameter to 20 μm, which is in a preferable range, in Working Example E, Ra is further improved (−0.02 nm).

(Manufacturing Magnetic Disk)

A magnetic disk for perpendicular magnetic recording was obtained by performing the following film formation step on the magnetic-disk glass substrate obtained in Working Example 1 above.

Specifically, an adherent layer constituted by a Ti-based alloy thin film, a soft magnetic layer constituted by a CoTaZr alloy thin film, a base layer constituted by a Ru thin film, a perpendicular magnetic recording layer made of a CoCrPt alloy, a carbon protective layer, and a lubricant layer were sequentially formed on the glass substrate. The protective layer is for preventing degradation of the magnetic recording layer caused by contact with the magnetic head, and the protective layer is composed of hydrogenated carbon and yields wear resistance. Also, the lubricant layer was formed by a dipping method using an alcohol-modified perfluoropolyether liquid lubricant.

With regard to the obtained magnetic disks, the result of testing glide properties using a DFH head was such that head crash did not occur and favorable results were obtained.

The invention claimed is:

1. A method for manufacturing a glass substrate, comprising:
    mirror-polishing, using a polishing liquid containing polishing abrasive particles consisting of organic-based particles, main surfaces of the glass substrate that have arithmetic average roughness Ra of 0.3 nm or less before the mirror-polishing using the polishing liquid containing the polishing abrasive particles consisting of the organic-based particles, the organic-based particles being made of an organic material which has a lower hardness than that of the glass substrate and has elasticity; and
    cleaning the glass substrate using an organic-based cleaning agent after the main surfaces of the glass substrate are mirror-polished.

2. The method for manufacturing the glass substrate according to claim 1, wherein
    the organic-based particles are made of a styrene-based resin, an acrylic resin, or a urethane-based resin.

3. The method for manufacturing the glass substrate according to claim 2, wherein
    the organic-based cleaning agent is an organic solvent or an amine compound.

4. The method for manufacturing the glass substrate according to claim 1, wherein
    the organic-based cleaning agent is an organic solvent or an amine compound.

5. The method for manufacturing the glass substrate according to claim 1, further comprising
    polishing the main surfaces of the glass substrate using a polishing liquid containing silica abrasive particles as polishing abrasive particles, wherein
    the mirror-polishing of the main surfaces of the glass substrate using the polishing liquid containing the polishing abrasive particles consisting of the organic-based particles is performed after the polishing of the main surfaces of the glass substrate using the polishing liquid containing the silica abrasive particles.

6. The method for manufacturing the glass substrate according to claim 1, wherein
    a particle diameter of the organic-based particles is in a range of 0.5 μm to 60 μm.

7. The method for manufacturing the glass substrate according to claim 1, wherein
    the glass substrate is a magnetic-disk glass substrate.

8. A method for manufacturing a glass substrate, comprising:
    polishing, using a polishing liquid containing polishing abrasive particles consisting of organic-based particles, main surfaces of the glass substrate that have arithmetic average roughness Ra of 0.3 nm or less before the polishing using the polishing liquid containing the polishing abrasive particles consisting of the manic-based particles, the organic-based particles being made of an organic material which has a lower hardness than that of the glass substrate and has elasticity; and after the polishing of the main surfaces of the glass substrate, bringing into contact with the main surfaces of the glass substrate an organic solvent that swells the organic-based particles, or a portion of the organic-based particles, that are attached to the main surfaces of the glass substrate.

9. The method for manufacturing the glass substrate according to claim 8, further comprising selecting the organic solvent such that SP2/SP1 is in a range of 0.9 to 1.1, to bring the organic solvent into contact with the main, surfaces of the glass substrate, when a solubility parameter (an SP value) of a monomer component of a resin that constitutes the organic-based particles is given as the SP1 and a solubility parameter (an SP value) of the organic solvent is given as the SP2.

10. The method for manufacturing the glass substrate according to claim 9, further comprising selecting the organic solvent further such that MW2/MW1 is 1.5 or less, to bring the organic solvent into contact with the main surfaces of the glass substrate, when a molecular weight of the monomer component of the resin that constitutes the organic-based particles is given as the MW1 and a molecular weight of the organic solvent is given as the MW2.

11. The method for manufacturing the glass substrate according to claim 8, further comprising polishing the main surfaces of the glass substrate using a polishing liquid containing silica abrasive particles as polishing abrasive particles, wherein the mirror-polishing of the main surfaces of the glass substrate using the polishing liquid containing the polishing abrasive particles consisting of the organic-based particles is performed after the polishing of the main surfaces of the glass substrate using the polishing liquid containing the silica abrasive particles.

12. The method for manufacturing the glass substrate according to claim 8, wherein a particle diameter of the organic-based particles is in a range of 0.5 μm to 60 μm.

13. The method for manufacturing the glass substrate according to claim 8, wherein the glass substrate is a magnetic-disk glass substrate.

14. A method for manufacturing a magnetic disk, comprising:

mirror-polishing, using a polishing liquid containing polishing abrasive particles consisting of organic-based particles, main surfaces of a glass substrate that have arithmetic average roughness Ra of 0.3 nm or less before the mirror-polishing using the polishing liquid containing the polishing abrasive particles consisting of the organic-based particles, and cleaning the glass substrate using an organic-based cleaning agent after the main surfaces of the glass substrate are mirror-polished, the organic-based particles being made of an organic material which has a lower hardness than that of the glass substrate and has elasticity; and forming at least a magnetic layer on the glass substrate to manufacture the magnetic disk after the cleaning.

* * * * *